(12) United States Patent
Clark et al.

(10) Patent No.: US 7,546,031 B2
(45) Date of Patent: Jun. 9, 2009

(54) LAMP BRACKET TO ILLUMINATION OPTICS ASSEMBLY INTERFACE

(75) Inventors: Stephan Clark, Albany, OR (US); Peter Guy Howard, Junction City, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 630 days.

(21) Appl. No.: 10/937,716

(22) Filed: Sep. 9, 2004

(65) Prior Publication Data

US 2006/0050247 A1 Mar. 9, 2006

(51) Int. Cl.
 - *G03B 21/14* (2006.01)
 - *G03B 21/22* (2006.01)
 - *G03B 21/00* (2006.01)
 - *F21L 4/00* (2006.01)

(52) U.S. Cl. ............... 396/84; 396/119; 396/121; 362/186

(58) Field of Classification Search .......... 353/85, 353/87, 119, 121, 84; 362/226, 273, 428, 362/374, 410, 507, 186; 313/318.11, 13; 248/476; 33/70

See application file for complete search history.

(56) References Cited

U.S. PATENT DOCUMENTS

| | | | | |
|---|---|---|---|---|
| 3,070,888 A * | 1/1963 | Gottesmann | ........... | 33/700 |
| 3,244,935 A * | 4/1966 | Robbins et al. | ........... | 315/129 |
| 3,749,960 A * | 7/1973 | Fuqua et al. | ........... | 313/318.11 |
| 4,423,953 A * | 1/1984 | Burnham | ........... | 355/70 |
| 4,429,351 A * | 1/1984 | Petzl et al. | ........... | 362/187 |
| 5,941,632 A * | 8/1999 | Wedell et al. | ........... | 362/410 |
| 6,056,405 A * | 5/2000 | Heintz et al. | ........... | 353/85 |
| 6,086,231 A * | 7/2000 | Kenjo et al. | ........... | 362/507 |
| 6,179,456 B1 | 1/2001 | Nakamura et al. | ........... | 362/510 |
| 6,428,198 B1 | 8/2002 | Saccomanno et al. | ........... | 362/559 |
| 6,454,418 B2 * | 9/2002 | Lee et al. | ........... | 353/87 |
| 6,461,025 B1 * | 10/2002 | Payne | ........... | 362/374 |
| 6,471,356 B1 | 10/2002 | Gohman et al. | ........... | 353/33 |
| 6,759,793 B2 * | 7/2004 | Narita | ........... | 313/13 |
| 7,104,654 B2 * | 9/2006 | Tamaru et al. | ........... | 353/85 |
| 2003/0147240 A1 * | 8/2003 | Gordin et al. | ........... | 362/226 |
| 2004/0090780 A1 * | 5/2004 | Burton | ........... | 362/273 |
| 2004/0223125 A1 * | 11/2004 | Tamaru et al. | ........... | 353/119 |
| 2004/0233397 A1 * | 11/2004 | Takemi | ........... | 353/97 |
| 2005/0001989 A1 | 1/2005 | Fujimori et al. | | |
| 2006/0103814 A1 * | 5/2006 | Clark et al. | ........... | 353/87 |

FOREIGN PATENT DOCUMENTS

| | | |
|---|---|---|
| EP | 1 396 753 A | 3/2004 |
| JP | 10-4742 A | 4/1998 |
| JP | 11-183808 A | 10/1999 |
| JP | 2002-244204 A | 8/2002 |
| WO | WO 2005/075884 A | 8/2005 |

OTHER PUBLICATIONS

NPL Documents, STIC Library Search, Sep. 24, 2008, all pages.*

* cited by examiner

*Primary Examiner*—Melissa J Koval

(57) ABSTRACT

A lamp bracket and illumination optics assembly interface including at least one bracket engaging member formed on the illumination optics; and a receiving member formed on the lamp bracket corresponding to the bracket engaging member such that the bracket engaging member is configured to be received at least partially within the receiving member in an overlapping configuration.

21 Claims, 5 Drawing Sheets

LAMP BRACKET TO ILLUMINATION OPTICS ASSEMBLY INTERFACE

BACKGROUND

Digital projectors, such as digital micro-mirror device (DMD) and liquid crystal device (LCD) projectors, project high quality images onto a viewing surface. Both DMD and LCD projectors utilize high intensity lamps and reflectors to generate the light needed for projection. Light generated by the lamp is concentrated as a "fireball" that is located at a focal point of a reflector. Light produced by the fireball is frequently directed from the lamp to an illumination optics assembly. The illumination optics assembly then focuses the light onto a spatial light modulator that produces images and utilizes the generated light to project the image onto a viewing surface. The efficiency of the lamp depends, at least in part, on the alignment of the lamp to the illumination optics, the lamp being held in place by a lamp bracket. This is of primary concern when using elliptical reflectors.

As a result, efforts have been directed at ensuring that the illumination optics assembly is properly oriented and aligned with respect to the lamp bracket. One prior solution consisted of registration pins and mating holes on small area flats. These have multiple tolerances corresponding to the position and diameters of each set of holes. Accordingly, the location of these datums are such that positional accuracy and joint stability are not optimized. The accuracy of such a lamp bracket and illumination optics assembly is determined, at least in part, by independently formed features that are then assembled.

Each part may be formed with a certain degree of accuracy. The accuracy with which the part can be formed is known as a tolerance. For example, if a part can accurately be formed within +/−0.001 inches of the idealized part shape, it has a tolerance of 0.001 inches. If four such parts are assembled, then the corresponding accuracy of the part is additive, such that the tolerance of the assembly is no more accurate than 0.004 inches in addition to the tolerance associated with putting the assembly together.

As a result, the accuracy of the lamp receiver discussed above depends on the accuracy of each of the independently formed parts and the accuracy of the assembly. The total of these tolerances may become sufficiently large causing the image uniformity and brightness to suffer. In addition, the formation of such lamp receivers can be time consuming and hence relatively expensive.

SUMMARY

A lamp bracket and illumination optics assembly interface including at least one bracket engaging member formed on the illumination optics, and a receiving member formed on the lamp bracket corresponding to the bracket engaging member such that the bracket engaging member is configured to be received at least partially within the receiving member in an overlapping configuration.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

The present method and apparatus provide for reliable, repeatable, and accurate alignment of an illumination optics assembly with respect to a lamp bracket. In particular, a lamp bracket and illumination optics assembly are provided that are configured to be coupled in an overlapping fashion. Such a configuration may increase the stability and the overall accuracy of the lamp bracket position relative to an illumination path. Increasing the length of the interface between the lamp bracket and the illumination optics mount reduces the tilt sensitivity of the lamp bracket to the illumination optics. The exemplary interface designs described in this disclosure use symmetric mounting principles of a cylinder or box structure.

The end of the lamp bracket connects to the illumination bracket by receiving the same type of shape. For example, if the bracket has a box shape on the end then the illumination optic mount would have a box shape to match the bracket. The two ends slide over one another to make a connection. Such a connection may make it possible for very strong joints but also very accurate joints as regards to position. The joint can be over a longer length, thus making it less sensitive to tilt. The joint is then subject to two total tolerances.

In the following description, for purposes of explanation, numerous specific details are set forth in order to provide a thorough understanding of the present method and apparatus. It will be apparent, however, to one skilled in the art, that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Display System

Figure 1:
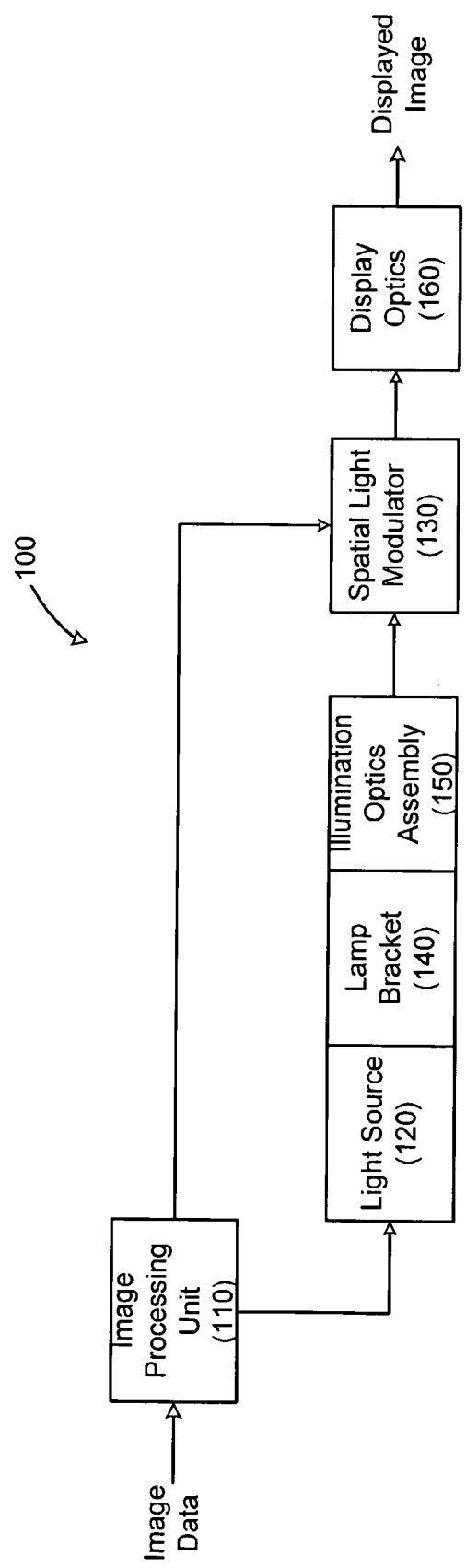
FIG. 1 illustrates a schematic view of a display system according to one exemplary embodiment.

FIG. 1 illustrates an exemplary display system (100). The components of FIG. 1 are exemplary only and may be modified or changed as best serves a particular application. As shown in FIG. 1, image data is input into an image processing unit (110). The image data defines an image that is to be displayed by the display system (100). While one image is illustrated and described as being processed by the image processing unit (110), it will be understood by one skilled in the art that a plurality or series of images may be processed by the image processing unit (110). The image processing unit (110) performs various functions including controlling the illumination of a light source (120) and controlling a spatial light modulator (SLM) (130).

The light source (120) is coupled to a lamp bracket (140). The lamp bracket (140) positions the light source (120) with respect to an illumination optics assembly (150). The illumination optics assembly (150) directs light from the light source (120) to the SLM (130). In particular, the lamp bracket (140) is configured to receive the illumination optics assembly (150) at least partially therein such that a portion of the inner surfaces of the lamp bracket (140) overlaps the outer surfaces of the illumination optics assembly (150). Such a configuration reduces the total number of tolerances associated with the formation of each of the components and thus the total number of tolerances associated with the resulting formation.

The terms "SLM" and "modulator" will be used interchangeably herein to refer to a spatial light modulator. The incident light may be modulated in its phase, intensity, polarization, or direction by the modulator (130). Thus, the SLM (130) of FIG. 1 modulates the light based on input from the image processing unit (110) to form an image-bearing beam of light that is eventually displayed or cast by display optics (140) on a viewing surface (not shown). The display optics (160) may include any device configured to display or project an image. For example, the display optics (160) may be, but are not limited to, a lens configured to project and focus an image onto a viewing surface. The viewing surface may be, but is not limited to, a screen, television, wall, liquid crystal display (LCD), or computer monitor.

The SLM (130) may be, but is not limited to, a digital mirror device (DMD), a single panel modulator device, a digital light processor (DLP) chip, and a liquid crystal on silicon (LCOS). Several exemplary embodiments of the lamp bracket (140) and the illumination optics assembly (150) will be discussed in more detail below, including the coupling of the illumination optics assembly (150) to the lamp bracket (140).

Schematic of Lamp Bracket and Illumination Optics Assembly

Figure 2:
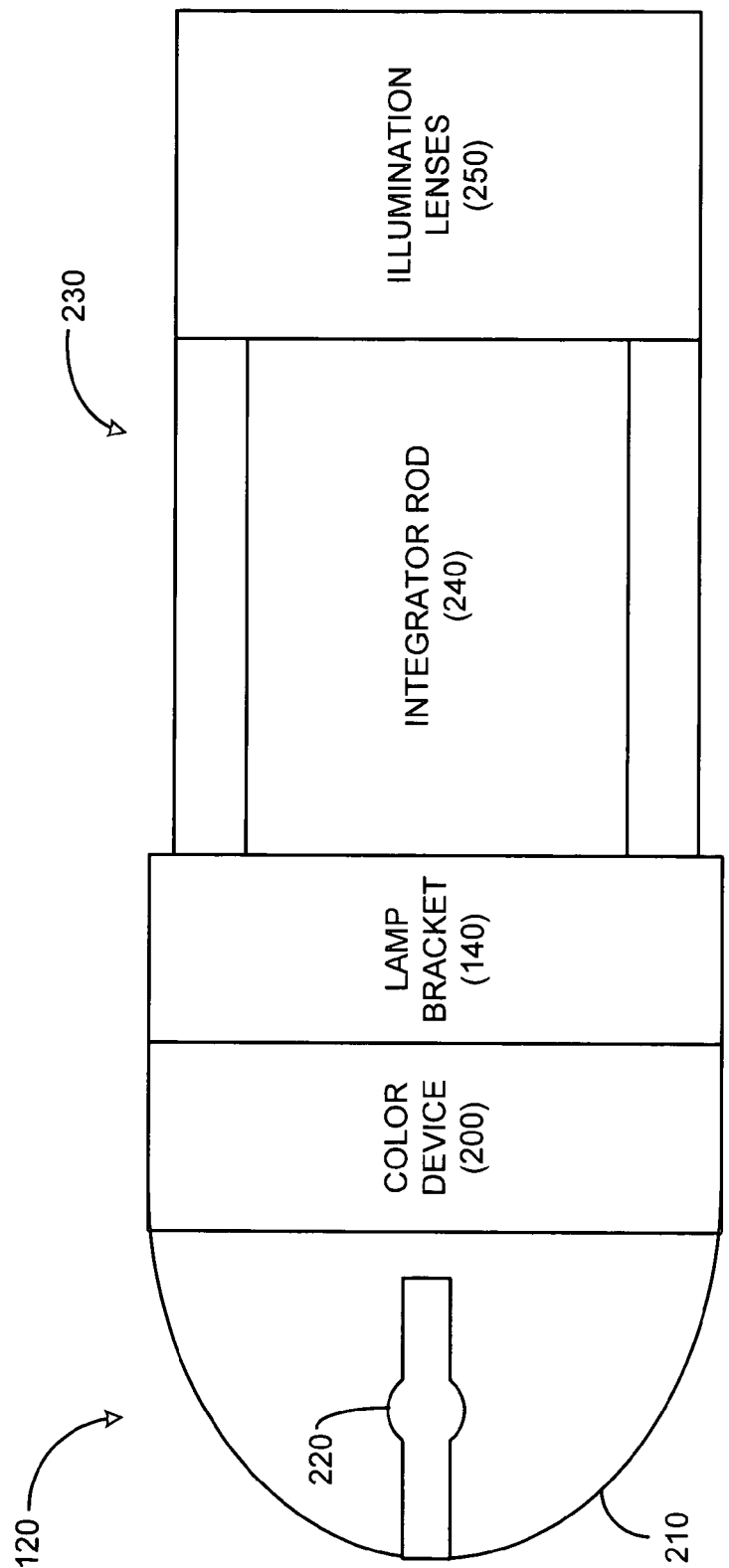
FIG. 2 illustrates a schematic view of a lamp bracket and illumination optics assembly interface according to one exemplary embodiment

FIG. 2 is a schematic view showing the light source (120) and the lamp mount bracket (140) in more detail. For ease of reference, the left-hand side of the assembly, or the portion of the assembly nearest the light source will be referred to as the proximal end while the opposite end will be referred to as the distal end. These designations are for ease of reference only.

FIG. 2 illustrates a color device (200) in place between the light source (120) and the lamp mount bracket (140). The light source (120) includes a reflector (210) and a burner (220). The burner (220) produces intense broad spectrum light, such as white light. The reflector (210) directs the light produced by the burner (220) to the color device (200). The color device (200) then selectively passes light of a given wavelength(s) through the lamp bracket (140) to the illumination optics assembly (150). Exemplary color devices include, without limitation, color wheels, as well as any device capable of selectively allowing desired wavelengths of light to pass through.

After light is selectively passed through the color wheel, the light is directed through the lamp mount bracket (140) and through the proximal end of the illumination optics mount (230). The illumination optics mount (230) has an integrator rod (240) and illumination lenses (250) coupled thereto such that the proximal end of the integrator rod (240) is adjacent the proximal end of the illumination optics mount (230).

The integrator rod (240) is an optical element that homogenizes the light produced by the light source (120). Many light sources, such as ultra high pressure (UHP) mercury light sources, produce non-uniform light. The integrator rod (240) aligns the non-uniform light that passes through the integrator rod (240) such that the light that exits the integrator rod (240) is more uniform. Once the light exits the integrator rod (240) it passes through the illumination lenses (250). The illumination lenses (250), which may be referred to as condenser optics, are used to focus the light onto the SLM (130; FIG. 1). The illumination lenses (250) may include any number of suitable lenses of any number of sizes and thicknesses configured to focus light onto the SLM (130; FIG. 1).

As will be discussed in more detail below, a portion of the distal end of the lamp bracket (140) is configured to receive a portion of the illumination optics mount (230) such that a portion of the inner surfaces of the lamp bracket (140) contacts the outer surfaces of the illumination optics mount (230). Such a configuration reduces the total number of tolerances associated with the formation of each of the components and the total number of tolerances associated with the resulting formation while increasing the strength of the joint.

Further, such a configuration allows the lamp bracket (140) and the illumination optics mount (230) to be formed with conventional machining methods such that the interfacing surfaces, or those surfaces of the lamp bracket (140) that contact the illumination optics mount (230) and vice versa, are formed along the most accurate machining paths of conventional machine tools. By increasing the accuracy of the position of the light source with respect to the illumination optics, a larger percentage of the light produced by the light source is directed to the SLM (130) by way of the illumination lenses (250), resulting in a more efficient display system (100). Two exemplary lamp brackets and illumination optic brackets will now be discussed in more detail.

Cylindrical Illumination Optic Mount and Corresponding Lamp Bracket

Figure 3:
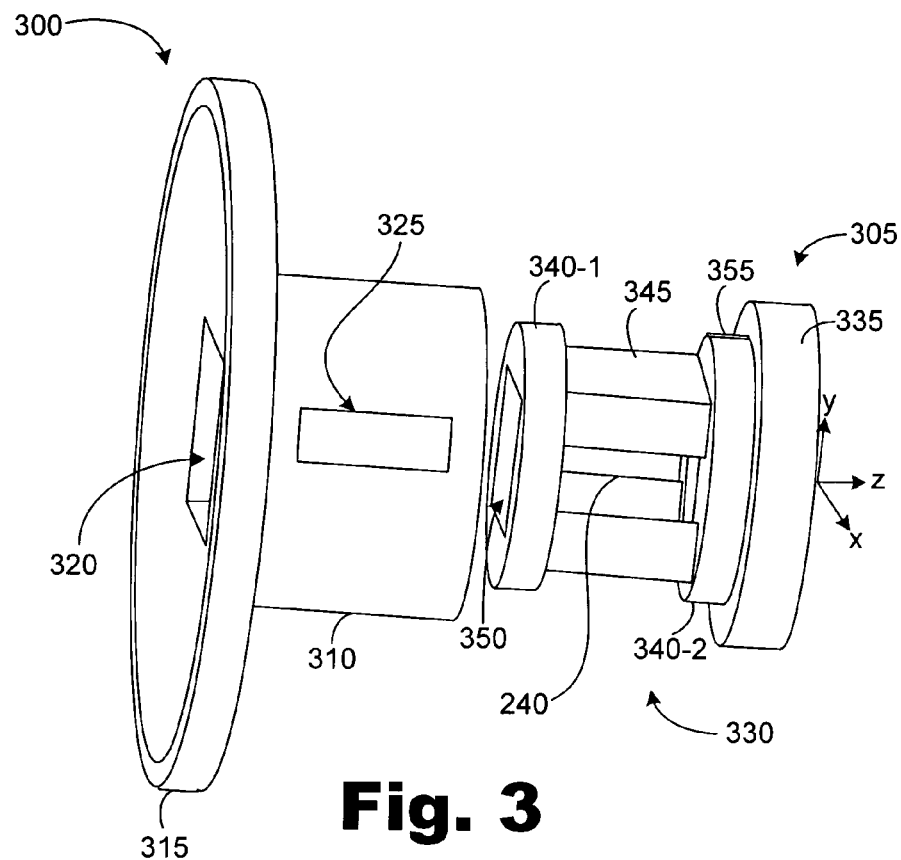
FIG. 3 illustrates a perspective exploded view of a lamp bracket and illumination optics assembly interface according to one exemplary embodiment.

FIG. 3 illustrates an exploded view of a lamp bracket (300) and an illumination optics assembly (305). When assembled, the lamp bracket (300) and the illumination optics assembly (305) are arranged in a partially overlapping manner. The lamp bracket (300) includes a receiving member (310) having a generally hollow cylindrical shape and a base (315) on the proximal end thereof. The base (315) has an opening (320) defined therein while the receiving member (310) has optional cooling openings (325) defined therein. The base (315) is configured to have a light source (120; FIGS. 1 and 2) and a color device (200; FIG. 2) coupled thereto. The cooling openings (325) allow air to flow over an integrator rod positioned within the illumination optics assembly (305) to cool the integrator rod. The receiving member (310) is configured to receive the proximal end of the illumination optics assembly (305).

The illumination optics assembly (305) includes an illumination optics mount (330), an integrator rod (240), and illumination lenses (335). The illumination optics mount (330) includes a plurality of bracket engaging members (340-1, 340-2) that are spaced apart by a plurality of span members (345). The bracket engaging members (340-1, 340-2) each have an opening defined therein that allows light to pass. In particular, the proximal bracket engaging member (340-1) has an opening (350) defined therein that is configured to interface with the opening (320) defined in the base (315). The proximal end of the integrator rod (240) is positioned adjacent or even within the opening (350) in the proximal bracket engaging member (340-1).

As a result, when the bracket engaging members (340-1, 340-2) are placed within the receiving member (310), the opening (350) defined in the proximal receiving member (310) is located to correspond with the opening (320) defined in the base (315) of the lamp bracket (300). This location establishes an illumination path that extends through the openings in the base (315) and the proximal bracket engaging member (340-1) to the integrator rod (240). The illumination path further extends from integrator rod (240) through the illumination lenses (335). The alignment of the lamp bracket (300) to the illumination optics assembly (305) helps ensure that light emitted from the light source (120; FIG. 1) is efficiently conveyed through the illumination optics mount assembly (305) and to the SLM (130; FIG. 1). This alignment will now be discussed in more detail.

In general, an object is able to move with six independent degrees of freedom. For example, if a rectangular coordinate system is chosen, an object may translate about the x-axis, the y-axis, and the z-axis. This translation represents three degrees of freedom. The other three degrees of freedom include rotation about the x-axis, the y-axis and/or the z-axis. Rotation about the x-axis and/or the y-axis may be referred to as tilt.

Figure 4:
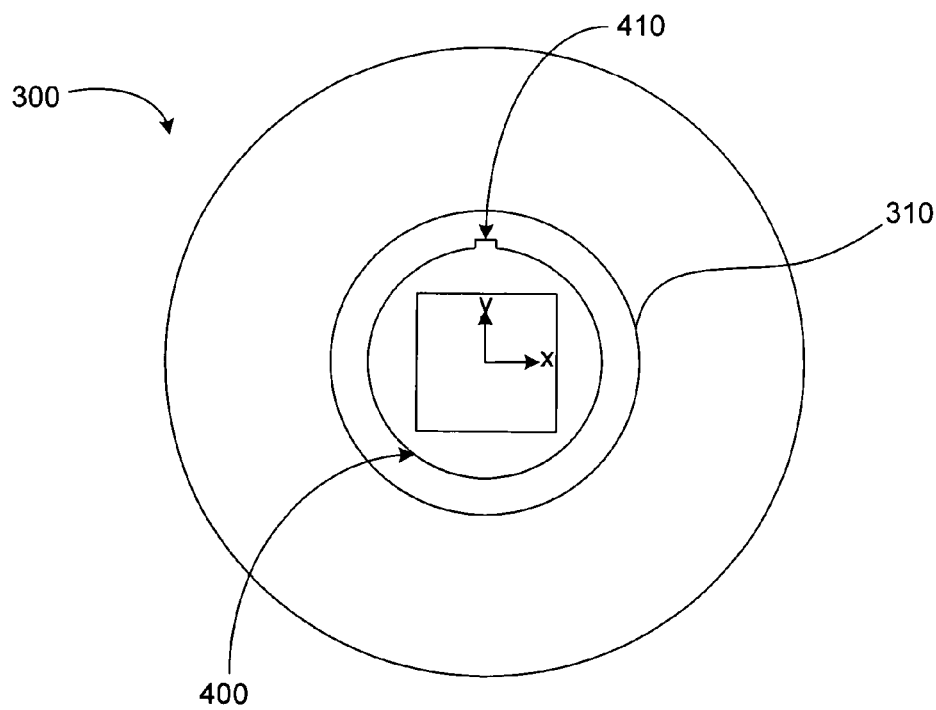
FIG. 4 illustrates a front view of a lamp bracket according to one exemplary embodiment.

FIG. 4 illustrates an end view of the lamp bracket (300) as viewed from the distal end or from the front. As shown in FIG. 4, the inside of the receiving member (310) is generally cylindrical. Referring to FIGS. 3 and 4, placing the bracket engaging members (340-1, 340-2) within the receiving member (310) constrains the location and orientation of the illumination optics assembly (305) relative to the lamp bracket (300) with respect to translation parallel to the x-axis and the y-axis, as well as with respect to rotation about the x-axis and the y-axis.

More specifically, when the bracket engaging members (340-1, 340-2) are placed within the receiving member (310), the bracket engaging members (340-1, 340-2) are placed in close contact with the inside surface (400) of the receiving member (310). Consequently, the translation of the illumination optics assembly (305) relative to the lamp bracket (300) is constrained parallel to the x-axis and the y-axis.

Further, as previously discussed the bracket engaging members (340-1, 340-2) are spaced apart from each other. This spacing constrains the rotation of the illumination optics assembly (305) relative to the lamp bracket (300). More specifically, the bracket engaging members (340-1, 340-2) contact the inside surface (400) of the receiving member (310) about substantially all of the circumferences of each of the bracket engaging members (340-1, 340-2).

Further, the simultaneous contact of the circumferences of each of the bracket engaging members (340-1, 340-2) with the inside surface (400) constrains the tilt of the illumination optics assembly (305) by simultaneously constraining the rotation of the illumination optics assembly (305) relative to the lamp bracket (300) with respect to the x-axis and the y-axis. This contact depends on the outer diameter of the bracket engaging members (340-1, 340-2) and the inside surface (400) of the receiving member (310). Consequently, the alignment of the illumination optics mount (330) with respect to the bracket member (300) is constrained by two total tolerances.

These surfaces may be constrained by controlling a single dimension, or the diameter of each of the parts. This control may be readily accomplished using well known turning methods, as will be discussed with reference to FIG. 7. Accordingly, translation and rotation of the illumination optics assembly (305) relative to the lamp bracket (300) may be constrained by controlling the diameters of the inside surface (400) and the bracket engaging members (340-1, 340-2). Further translation of the illumination optics assembly (305) may be constrained by placing the proximal bracket engaging member (340-1) in contact with the base (315) of the lamp bracket (300).

To this point, the constraint of the illumination optics assembly (305) relative to the lamp bracket (300) has been discussed with respect to translation about the x-axis, the y-axis, and the z-axis as well as with respect to rotation about the x-axis and the y-axis. Accordingly, five of the six degrees of freedom previously introduced have been discussed. The final degree of freedom is rotation about the z-axis.

Rotation about the z-axis may be controlled by forming a tab (355; FIG. 3) on the distal bracket engaging member (340-2) and a corresponding gap (410) on the receiving member (310). According to such a configuration, the tab (355) is aligned with respect to the gap (410) to allow the distal bracket engaging member (340-2) to be placed within the receiving member (310). The resulting contact between the tab (355) and the gap (410) constrains the rotation of the illumination optics assembly (305) with respect to the lamp bracket (300). This relationship between the illumination optics assembly (305) and the lamp bracket (300) may be secured using fasteners or any other suitable means.

Accordingly, the configuration of the lamp bracket (300) and the illumination optics assembly (305) reduces the total number of tolerances associated with the formation of each of the components and the total number of tolerances associated with the resulting formation. Further, as introduced such a configuration may allow the interfacing surfaces, or those surfaces of the lamp bracket (300) that contact the illumination optics mount (330) and vice versa, to be formed along the most accurate machining paths of conventional machine tools.

By increasing the accuracy of the position of the light source with respect to the illumination optics, a larger percentage of the light produced by the light source (120; FIG. 1) is directed to the SLM (130; FIG. 1) by way of the illumination optics assembly (305). A cylindrical overlapping configuration has been discussed with reference to FIGS. 3 and 4. Other overlapping configurations are possible according to other exemplary embodiments. Another such configuration will now be discussed with reference to FIGS. 5 and 6.

Rectangular Illumination Optic Mount and Corresponding Lamp Bracket

Figure 5:
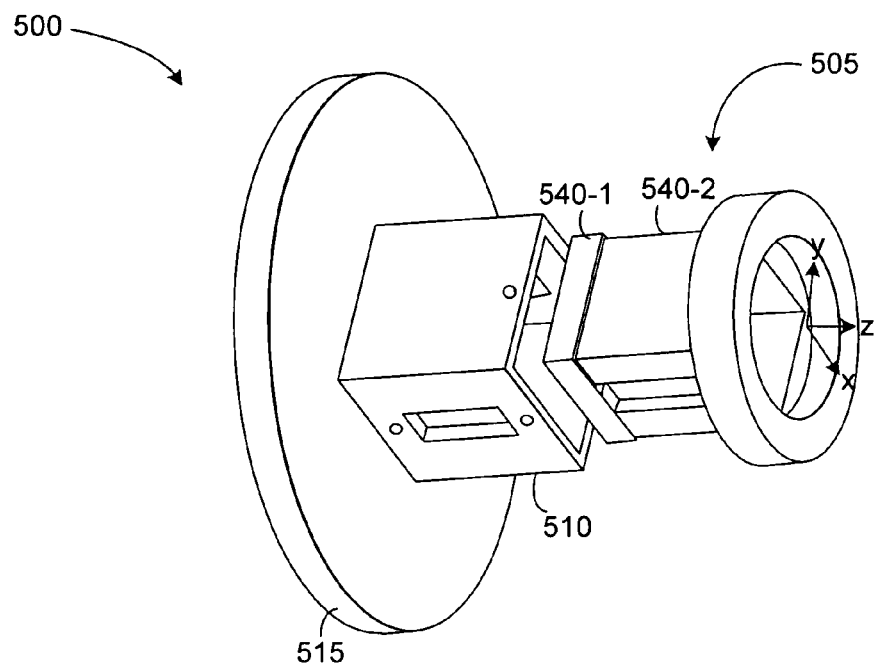
FIG. 5 illustrates a perspective exploded view of a lamp bracket and illumination optics assembly interface according to one exemplary embodiment.

FIG. 5 illustrates an exploded perspective view of a lamp bracket (500) and an illumination optics assembly (505). In a similar fashion as discussed with reference to FIGS. 3 and 4, when the lamp bracket (500) and the illumination optics assembly (505) are coupled together, the bracket engaging members (540-1, 540-2) are received at least partially within the receiving member (510). In particular, the receiving member (510) includes four generally rectangular walls that form an open-ended box-type structure. The inner dimensions of the box-type structure correspond to the shape of bracket engaging members (540-1, 540-2) formed on the illumination optics mount (530).

As a result, the bracket engaging member (540-1, 540-2) may be placed in contact with the inner surfaces of the receiving member (510). This configuration constrains the rotation of the illumination optics assembly (505) with respect to the lamp bracket (500) in a similar fashion as discussed with reference to FIGS. 3 and 4. Further, the rectangular shape of the bracket engaging members (540-1, 540-2) and the inner surface of the receiving member (510) constrains the rotation of the illumination optics assembly (505) with respect to the lamp bracket (500).

Translation parallel to the z-axis is constrained by contact between the proximal bracket engaging member (540-1) and the base (515) of the lamp bracket (500). Accordingly, the illumination optics assembly (505) and the lamp bracket (500) may be coupled in an overlapping fashion such that their relative orientation and position is fully constrained. Further, as previously discussed, this overlapping coupling increases the strength of the resulting assembly while minimizing tilt error.

In addition, as previously discussed, such a configuration reduces the total number of tolerances associated with each part by allowing the interfacing surfaces of each of the parts to be formed along the most accurate machining directions of a conventional machine tool. With respect to FIGS. 5-6, the interfacing surfaces may be formed by a conventional milling machine along orthogonal planes. More specifically, the bracket engaging members (540-1, 540-2) may be formed by a milling machine that passes the tool along tool paths that are parallel to the major axes of the milling machine.

Figure 6:
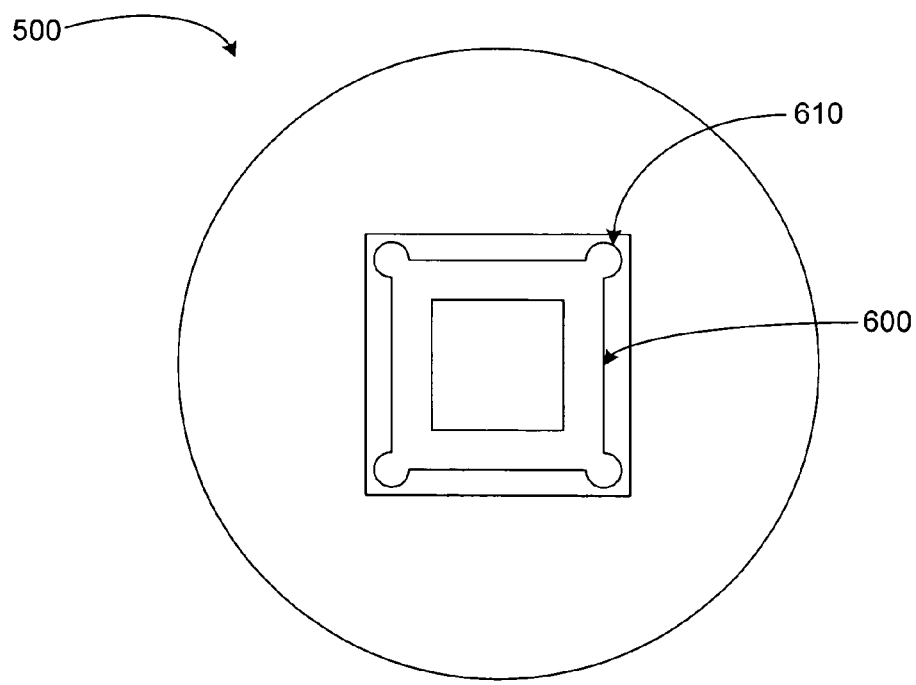
FIG. 6 illustrates a front view of a lamp bracket according to one exemplary embodiment

Similarly, as shown in FIG. 6, the inside contact surfaces (600) of the receiving member (510) may also be formed by passing the tool parallel to the principal axes of the machine. The inside contact surfaces (600) shown are formed using a mill having a generally cylindrical cutting tool that is moved along tool paths that are orthogonal to the principal axes of the machine. As the mill approaches the end of each of the inside contacts surfaces, the leading edge of the mill leaves a slightly rounded section. If left rounded, these sections may interfere with a part of a rectangular or square cross section as the part is received in the receiving member (510). After the inside contact surfaces (600) have been formed, pocket holes (610) are formed to allow the rectangular bracket engaging members (540-1, 540-2) to be placed within the receiving member (510) while allowing the bracket engaging members (540-1, 540-2) to be placed in contact with the inside contact surfaces (600).

Method of Coupling an Illumination Optics Assembly to a Lamp Bracket

Figure 7:
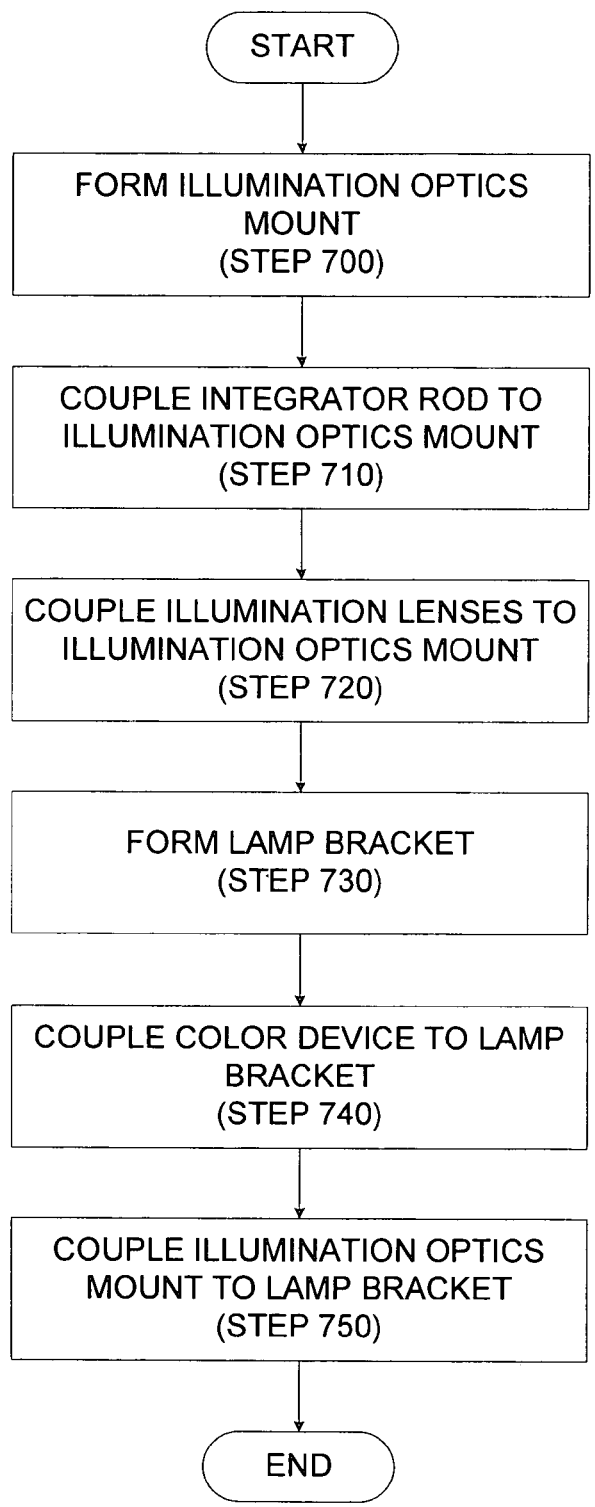
FIG. 7 is a flowchart illustrating a method of coupling an illumination optics assembly to a lamp bracket according to one exemplary embodiment.

FIG. 7 is a flowchart illustration of coupling an illumination optics assembly to a lamp bracket according to one exemplary embodiment. One exemplary method is described herein in a particular order. Those of skill in the art will understand that the steps may be performed in several different orders and the present description is provided for ease of reference only. Further, not all of the steps need be performed.

The method begins by forming an illumination optics mount (step 700). The illumination optics mount includes a cavity formed therein for receiving an integrating rod. Further, the illumination optics mount is also configured to have illumination lenses coupled thereto. The illumination optics mount also includes at least one bracket engaging member. For ease of reference, a plurality of bracket engaging members will be discussed. These bracket engaging members may be formed using the most accurate machine paths of a given machine tool. Further, the bracket engaging members may be formed by molding.

For example, if bracket engaging members are to be formed, the bracket engaging members may be formed using a turning machine such as a lathe. According to such an operation, the shape of the bracket engaging member depends on a single tolerance, which is the position of the cutting tool on the lathe.

Further, if rectangular or square bracket engaging members are to be formed, the bracket engaging members may be formed using a machine tool such as a mill. The bracket engaging members may be formed by passing the machine tool along tool paths corresponding to the major axes of the machine tool. In either case, the shape of the bracket engaging members corresponds to an accurate machining method. The bracket engaging members are the portions of the lamp engaging mount that interface with a lamp bracket. Once the illumination optics mount is formed, an integrator rod is coupled thereto (step 710) as are illumination lenses (step 720).

The method also includes forming a lamp bracket (step 730). Forming the lamp bracket includes the formation of a base and a receiving member. The receiving member has a receiving cavity defined therein by an inner surface. The cross section of the inner surface corresponds closely to the cross section of the bracket engaging members.

For example, if the bracket engaging members have a cylindrical cross section, the inner surfaces are formed to correspond to that cross section. Similarly, if the bracket engaging members have a square cross section, the inner surfaces are formed that correspond to the bracket engaging members. In either case, the inner surfaces may be formed using substantially the same machine tools used to form the bracket engaging members. Further, bracket engaging members may be formed by molding.

Once the lamp bracket has been formed, a color device is coupled thereto (step 740). According to one exemplary embodiment, the color device is a color wheel that is coupled to the base of the lamp bracket.

The illumination optics assembly is then coupled to the lamp bracket (step 750). The illumination optics assembly is coupled to the lamp bracket by placing the bracket engaging members into contact with the receiving member such that the lamp bracket overlaps a portion of the illumination optics assembly. Accordingly, the present method provides for reliable, repeatable, and accurate alignment of a lamp mount assembly to an illumination optic assembly.

In conclusion, a lamp bracket and illumination optics assembly are provided that are configured to be coupled in an overlapping fashion. Such a configuration may increase the stability and the overall accuracy of the lamp bracket position to an illumination path. Increasing the length of the interface between the lamp bracket and the illumination optics mount reduces the tilt sensitivity of the lamp bracket to the illumination optics.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the invention be defined by the following claims.

What is claimed is:

1. A lamp bracket and illumination optics assembly interface, comprising:
   at least one bracket engaging member formed on said illumination optics; and
   a receiving member formed on said lamp bracket corresponding to said bracket engaging member such that said bracket engaging member is configured to be received at least partially within said receiving member in an overlapping configuration;
   wherein said lamp bracket further comprises a coupling for mounting a color device in addition to a lamp assembly on said lamp bracket.

2. The interface of claim 1, wherein said bracket engaging member has a generally cylindrical shape.

3. The interface of claim 1, wherein said bracket engaging member includes a tab and said receiving member includes a gap formed on an inner surface corresponding to said tab.

4. The interface of claim 1, wherein said at least one bracket engaging member slides into said receiving member of said lamp bracket along an optical axis of a lamp mounted to said lamp bracket.

5. The interface of claim 1, wherein said illumination optics are arranged to focus light from a lamp coupled to said lamp bracket on a light modulator.

6. The interface of claim 1, wherein said receiving member surrounds said bracket engaging member when said bracket engaging member is inserted into said receiving member.

7. A method of forming a lamp bracket, comprising:
forming a receiving member, wherein said receiving member includes an inner surface, said inner surface being formed subject to a single tolerance and said receiving member being configured to receive at least one bracket engaging member formed on an illumination optics assembly at least partially therein, wherein said bracket engaging member is inserted into said receiving member along an optical axis of said illumination optics assembly;
wherein forming said inner surface includes defining a generally rectangular cavity in said receiving member, and wherein forming said inner surface includes passing a machine tool along tool paths parallel to major axes of said machine tool.

8. The method of claim 7, wherein forming said inner surfaces further comprises forming pocket holes.

9. The method of claim 7, wherein forming said receiving member includes forming a receiving member having an open-box type structure.

10. A method of forming a lamp bracket, comprising:
forming a receiving member, wherein said receiving member includes an inner surface, said inner surface being formed subject to a single tolerance and said receiving member being configured to receive at least one bracket engaging member formed on an illumination optics assembly at least partially therein, wherein said bracket engaging member is inserted into said receiving member along an optical axis of said illumination optics assembly;
wherein forming said inner surface includes defining a generally cylindrical cavity in said receiving member; and
wherein forming said inner surface on said receiving member includes turning said lamp bracket on a machine tool.

11. The method of claim 10, wherein forming said receiving member includes forming a receiving member having a hollow cylindrical structure.

12. The method of claim 10, and further comprising forming a gap on an inner surface of said receiving member.

13. A method of forming an illumination optics mount, comprising:
forming at least one bracket engaging member having an outer surface subject to a single tolerance and wherein said bracket engaging member is configured to be placed into contact with an inner surface of a receiving member;
wherein forming said bracket engaging member includes forming a bracket engaging member having an rectangular box type structure, and wherein forming said bracket engaging member includes passing a machine tool along tool paths parallel to major axes of said machine tool.

14. The method of claim 13, wherein forming said bracket engaging member includes forming a generally rectangular bracket engaging member.

15. The method of claim 13, wherein forming said bracket engaging member includes forming a generally cylindrical receiving member.

16. A method of forming an illumination optics mount, comprising:
forming at least one bracket engaging member having an outer surface subject to a single tolerance and wherein said bracket engaging member is configured to be placed into contact with an inner surface of a receiving member;
wherein forming said bracket engaging member includes forming a generally cylindrical receiving member; and
wherein forming said inner surface on said receiving member includes turning said lamp bracket on a machine tool.

17. The method of claim 16, wherein forming said bracket engaging member includes forming a bracket engaging member having a cylindrical structure.

18. The method of claim 17, and further comprising forming a tab on said bracket engaging member.

19. A lamp bracket and illumination optics assembly interface, comprising:
at least one bracket engaging member formed on said illumination optics; and
a receiving member formed on said lamp bracket corresponding to said bracket engaging member such that said bracket engaging member is configured to be received at least partially within said receiving member in an overlapping configuration;
wherein said bracket engaging member comprises an integrator rod that is received at least partially within said receiving member so as to be optically coupled to a lamp mounted on said lamp bracket.

20. A lamp bracket and illumination optics assembly interface, comprising:
at least one bracket engaging member formed on said illumination optics; and
a receiving member formed on said lamp bracket corresponding to said bracket engaging member such that said bracket engaging member is configured to be received at least partially within said receiving member in an overlapping configuration;
wherein said receiving member comprises cooling openings configured to allow an air flow into an interior of said receiving member.

21. A lamp bracket and illumination optics assembly interface, comprising:
at least one bracket engaging member formed on said illumination optics; and
a receiving member formed on said lamp bracket corresponding to said bracket engaging member such that said bracket engaging member is configured to be received at least partially within said receiving member in an overlapping configuration;
wherein said lamp bracket comprises:
a base for coupling said lamp bracket to a color device and lamp assembly; and
said receiving member comprising a cylindrical socket extending from said base along an optical axis of the lamp assembly.

* * * * *

UNITED STATES PATENT AND TRADEMARK OFFICE
CERTIFICATE OF CORRECTION

PATENT NO. : 7,546,031 B2
APPLICATION NO. : 10/937716
DATED : June 9, 2009
INVENTOR(S) : Stephan Clark et al.

Page 1 of 1

It is certified that error appears in the above-identified patent and that said Letters Patent is hereby corrected as shown below:

In column 9, line 48, in Claim 10, delete "member:" and insert -- member; --, therefor.

Signed and Sealed this

Twenty-seventh Day of October, 2009

David J. Kappos
*Director of the United States Patent and Trademark Office*